United States Patent [19]

Luksas et al.

[11] 3,873,730

[45] Mar. 25, 1975

[54] PRODUCTION OF SOY SAUCE

[75] Inventors: Anthony J. Luksas; Wilmore Williams, both of Chicago, Ill.

[73] Assignee: Beatrice Foods Company, Chicago, Ill.

[22] Filed: Jan. 4, 1973

[21] Appl. No.: 320,842

Related U.S. Application Data

[63] Continuation-in-part of Ser. No. 36,427, May 11, 1970, Pat. No. 3,711,303.

[52] U.S. Cl. ............... 426/46, 426/60, 426/62, 426/203, 426/221
[51] Int. Cl. ............................................. A23l 1/20
[58] Field of Search ..................................... 426/46

[56] References Cited
UNITED STATES PATENTS

| | | | |
|---|---|---|---|
| 1,394,236 | 10/1921 | Togano | 426/46 |
| 3,495,991 | 2/1970 | Mogi et al | 426/46 |
| 3,711,303 | 1/1973 | Luksas | 426/46 |

FOREIGN PATENTS OR APPLICATIONS

| | | | |
|---|---|---|---|
| 139,609 | 3/1948 | Australia | 426/46 |

OTHER PUBLICATIONS

Hesseltine, Industrial Mycology, "Shoyu," Mycologia Vol. 57, 1965, pp. 174–177.

Lodder et al, "The Yeasts," North Holland Pub. Co., Amsterdam, Interscience, N.Y., 1952, pp. 142–145.

*Primary Examiner*—Samih N. Zaharna
*Assistant Examiner*—J. M. Hunter
*Attorney, Agent, or Firm*—Cushman, Darby & Cushman

[57] ABSTRACT

Soy sauce is produced in a relatively short time by fermenting Maromi with an inoculant selected from Saccharomyces and Debaryomyces or a Meromi isolate and an organism from the genus Torulopsis.

28 Claims, No Drawings

PRODUCTION OF SOY SAUCE

This is a continuation-in-part of U. S. application Ser. No. 36,427, filed on May 11, 1970 now U.S. Pat. No. 3,711,303, the entire disclosure of which is incorporated herein by reference.

The present invention relates to the production of soy sauce and to soy sauce having the natural flavor and taste of aged soy sauce. The invention further relates to such soy sauce which may be produced in a relatively short time.

Soy sauce may be made by fermentation or enzymatic hydrolysis of protein to give amino acids and low-molecular-weight polypeptides or by the acid hydrolysis process. The former of these two processes, i.e. the fermentation process, is by far the more important process, since it gives the soy sauce a full body and flavor as opposed to the acid hydrolysis process. Hence, most of the soy sauce, especially the higher quality Oriental type soy sauce, manufactured in the United States is made by the fermentation process.

Briefly stated, the fermentation process for preparing soy sauce comprises preparing a mixture of soybeans and wheat, and adding to the mixture a Koji culture. The mixture of soybeans, wheat and the Koji culture is allowed to biologically alter for up to 10 days and this biologically altered mixture is called Koji.

Koji is mixed with an 18 aqueous salt solution, and the mixture is called Maromi. The Maromi is then allowed to ferment for an extended time period. While some soy sauce flavor can be developed after fermentation of the Maromi for as litle as 30 days, for full-bodied and full-flavored soy sauce, the fermentation is normally allowed to proceed for at least 6 months and preferably up to a year or more, e.g., 18 months.

Generally speaking the temperature of Koji fermentation will be betweeb 60° and 110°F., e.g., 80° and 84°F. During this period the Koji culture produces growth mainly of Aspergillus oryzae. The resulting Maromi is allowed to ferment at 60° to 110°F, especially 68° to 90°F and ideally 80° to 84°F for an extended period of time.

After the fermentation is complete and the desired degree of body and flavor has been reached, the fermented mass is pressed and the liquid obtained therefrom is soy sauce. The soy sauce may be further mixed with other agents such as salt, coloring, preservatives and the like. As can be noted from the above discussion of the fermentation process for producing soy sauce, the fermentation step requires that the Maromi be allowed to ferment for an extended period of time and that large holding vessels for fermenting the mixture are necessary to produce sizeable amounts of soy sauce. As can be also appreciated, it would be desirable to shorten the time of the Maromi fermentation step required to produce a full-bodied and full-flavored soy sauce. Equally important, however, is the requirement that any shortened fermentation time of the Maromi must still result in a full-flavored and fullsoy sauce, of the quality expected by the general consuming public.

In the aforementioned copending application, there is disclosed a process for producing soy sauce by fermenting conventional Koji, as described above, in the presence of the defined specific organisms. In the process, the Koji is comminuted to a relatively small particle size, e.g., by grinding, so that all particles pass through a number 3 U.S. sieve screen, especially a number 6 U.S. sieve screen, and especially the average particle size should be less than 1,000 microns, e.g., 1 to 100 microns. The temperature of the Koji during grinding is kept below 145°F, especially below 130°F, e.g., below 100°F, in order to prevent the destruction of the enzymes contained in the Koji. Salt is added to the Koji either before or after grinding. Alternately, instead of grinding the Koji, the soybeans, wheat, etc., from which the Koji is made may be ground prior to making the Koji, in the same manner as described above. In this case, the above noted temperature requirements are not so critical.

The Koji is then added to water and at this point salt is added, if the salt was not added during the grinding process. The resulting mixture of Koji, salt and water (Maromi) contains from 5 to 40 w/v% of the Koji, especially between 20 and 25 w/v%. The amount of salt in the resulting mixture, added either prior to grinding or after grinding, is between 6 to 30 w/v%, especially between 15 and 20% and ideally about 18 w/v%. Common sodium chloride is the preferred salt.

After inoculation, the Maromi is initially fermented for from about 3 to 14 days. Of course longer periods than 14 days may be used but there is no substantial advantage in continuing the fermentation longer than 14 days. The initial fermentation is carried out in a closed vessel having an inert gas head space. But preferably, at least some intermittent aeration is carried out during the initial fermentation. The inert gas provides essentially anaerobic conditions and the anaerobic conditions may be insured by continuously or intermittently flushing with the inert gas. The intermittent aeration may be carried out by flushing the head space of the vessel with an inert gas, such as nitrogen, containing low levels of oxygen. Agitation during this initial fermentation period is not essential when no aeration is performed, but agitation is required, at least during part of each aeration step, when aeration is used.

As noted above, during this initial fermentation period, the fermenting Maromi is preferably aerated for short periods of time. This may be accomplished by stirring the fermenting Maromi and sweeping oxygen-containing gases, e.g., air, through the head space of the closed vessel. The amount of oxygen in the head space of the closed vessel during these aerations may be quite low; similarly the dwell period to the oxygen containing gas may be quite short, and can vary from as quickly as the oxygen containing gas can replace the inert gas in the head space and the oxygen containing gas can be subsequently replaced by the inert gas to up to 2 or 3 hours or more. It is not necessary that the oxygen containing gas be allowed to dwell in the head space for any extended period of time and only a momentary displacement of the inert gas in the head space is necessary. However, generally speaking, the oxygen-containing gas will be allowed to dwell in the head space from 1 to 50 minutes, especially from 4 to 15 minutes and preferably about 5 minutes. The frequency of aeration can vary widely and may be from as little as once every four days to as often as once every 10 minutes, especially from once every 2 days to 5 times a day and preferably approximately 2 to 3 times a day. Of course, during this aeration period the fermentating Maromi should be agitated.

The purpose of these intermittent aeration steps is essentially accomplish in the fermenting Maromi a microaerophillic condition, i.e., a state of oxygen tension that is less than atomspheric and being on the border between aerobic and anaerobic conditions. As can be appreciated from the above, the initial fermentation can be under either anaerobic or microaerophillic conditions, but microaerophillic conditions are preferred. Microaerophillic conditions, at least for part of the fermentation time, develop a superior full-flavor and full-body soy sauce.

Alternately, instead of intermittent aerations, as discussed above, microaerophillic conditions may be established on a continuous basis by emitting with the inert gas an extremely low level of oxygen into the head space of the closed vessel. The amount of oxygen introduced with the inert gas into the head space of the closed vessel will vary widely depending upon the volume of the head space, the volume of the fermenting mixture, the temperature of fermentation, the state of fermentation, etc. Hence no specific amounts of oxygen can be stated as a general case, but one skilled in the art can readily determine when microaerophillic conditions are produced within the fermenting Maromi and adjust the oxygen content to maintain those microaerophillic condiltions.

After the initial fermentation period, the fermenting Maromi is further fermented for an additional 5 to 30 days or longer, if desired, either in a sealed vessel or with low levels of intermittent or continuous aeration. Hence, the second fermentation may be anaerobic, microaerophillic or mildly aerobic, but microaerophillic or mildly aerobic conditions are preferred, since these conditions produce a superior ultimate flavor. Preferably the Maromi is agitated during the aerations.

The second fermentation may be carried out at the same temperatures as the initial fermentation and indeed the same procedure for introducing oxygen into the head space may be used. Hence, the second fermentation step may be simply an extension of the first fermentation step, especially where microaerophillic conditions are used in both the first and second fermentations.

After the subsequent second fermentation step, the solids are separated from the liquid by any conventional means, e.g., filtering, pressing, cventrifuging, vacuum distillation, etc. The recovered liquid is then mixed with conventional additives such as salts, edible coloring, e.g., caramel, other flavors, preservatives, sweeteners, such as sugars, spices, etc. to produce the finished soy sauce ready for sale to the consuming public. Alternately, the product may be pasteurized either before or after the addition of the additives or before packaging. It is not necessary, however, to pasteurize the soy sauce and indeed some additional flavor will develop after packaging the soy sauce when the soy sauce has not been pasteurized.

The inoculant used with the process is a yeast of the family Endomycetaceae, subfamily Saccharomycetoideae, tribe Saccharomyceteae, and particularly useful yeasts of the said tribe are selected from Saccharomyces and Debaryomyces.

However, in a preferred embodiment of the invention the inoculant is isolated from Maromi since the isolated inoculant gives a better flavor to the soy sauce as opposed to the flavor obtained by using commercially available organisms. The isolated inoculant can be obtained by preparing two aqueous solutions YM agar powder, one with 18 W/V% of NaCl and one with water only, sterilizing the solutions, preparing plates, inoculating each plate with approximately one year old Maromi, incubating the inoculated plates for about four days at 71°F, and removing the yeast growths from both the water and saline plates and serially growing the yeasts on new YM ager and YM agar plus salt plates, respectively, until essentially pure cultures of yeasts are obtained and the cultures are essentially free from bacteria and mold cultures.

After the yeast cultures have been purified, as discussed above, the purified cultures are visually observed under daylight and compared with respect to the following appearances: dull, shiny (glistening) and flaky. The observer will see that some of the yeast cultures are strikingly different from other of the yeast cultures in these three respects, and dull, shiny and flaky cultures will be readily apparent. (With proper streaking of the first Maromi culture, these three appearances will be readily apparent in the first culture of the Maromi and by retaining only the cultures having these three appearances the number of cultures and number of serial growing may be materially reduced.)

The cultures having a dull, shiny or flaky appearance will be those cultures containing the organisms of the present invention. Any one of these cultures may be used to produce soy sauce, but a combination of the three cultures produce an exceptional flavor, body and bouquet.

For purposes of the present specification and claims, the above described organisms are defined by the terms "Maromi isolated organisms." When pure culture organisms, obtained commercially, are used, as opposed to isolating the organisms, as noted above, it is also preferred that at least one Saccharomyces and at least one Debaryomyces be used in combination to inoculate the Koji, although only one of the two will produce an acceptable soy sauce. The preferred species are Saccharomyces rouxii and Debaryomyces hansenii.

Thus, in the aforementioned copending application, the process is an improvement in the Koji and Maromi process for production of soy sauce, and the improvement comprises inoculating the Koji or Maroomi with yeast selected from Saccharomyces and Debaryomyces and mixtures thereof and Maromi isolated organisms, fermenting the inoculated Koji or Maromi for at least 1 day, e.g., at least 3 days, and separating the liquid of the ferment from the solids. This produces an excellent oriental-style soy sauce. However, it has now been discovered that the soy sauce produced by that process may be improved in terms of the resulting flavor when the Koji or Maromi is additionally inoculated with yet a further organism. The further organism is from the genus Torulopsis. This organism may be added at any point in the process of the aforementioned application, but it is preferred that the organism be added toward the latter stages of fermentation. Thus, it is preferred that the Torulopsis organism be added after the fermentation has proceeded for at least five days, preferably one week and more preferably two weeks. In other words, the process of the aforementioned application is carried out in the manner described therein, but according to the present invention a member of the genus Torulopsis is added to the fermenting Koji or Maromi (hereinafter) referred to simply as the Maromi for sake of convenience) after the above noted times.

The amount of organism of the genus Torulopsis added to the fermenting Maromi can vary widely, but generally speaking at least 10 organisms per gram of fermenting media, especially 100, e.g., 1,000 to 10,000 or more organisms per gram are preferred. Large inoculation dosages may be used, if desired, and 50,000 or 100,000 or 1 million organisms per gram of medium may be used if desired.

After inoculating the fermenting Maromi with the *Torulopsis* organism, the process is carried out under the same conditions as set forth in the aforementioned application. Thus, the time, temperature and conditions of fermentation are the same as those of the aforementioned application, and the entire process is, after inoculation with the present organisms, continued in the manner of that application.

It is also to be understood that the meanings and definitions of the various terms used in the aforementioned copending application are incorporated herein by reference to that application and those terms should be construed in those same regards.

The genus Torulopsis is a member of the subfamily Cryptococcoidea which in turn is a member of the family Cryptococceceae. Torulopsis organisms are characterized by multilateral budding, no pseudo mycelium or mycelium, no formation of start-like compounds and is generally a fermenter, *Torulopsis aeris, T,pinus* and *T, inconspicua* being divergent in this latter regard. Examples of organisms from the genus are *Torulopsis anatomiae, T. apicola, T. apis, T, bovina, T, cantarelli, T. castelli, T. colliculosa, T. dattila, T. domercgii, T. ernobii T, etchellsii, T. globosa, T. gropengiesseri, T. haemulonii, T. halonitratophila, T. holmii, T. inconspicua, T. ingeniosa, T. lactis*-condensi, *T. maris, T. molishiana, T. nitratophila, T. pintolopesii, T. pinus, T. sphaerica, T. stellata, T. torresii, T. vanderwaltii, T. versatilis* and *T. wickerhamii*. The preferred organisms are *T. versatilis* and *T. sphaerica* and the more preferred organism is *T. versatilis*.

The following examples will illustrate the preferred embodiments of the process, but it should be understood that the invention is not limited to the following examples but is applicable to the extent of the foregoing disclosure.

EXAMPLE 1 1

A conventional Koji was prepared by boiling in water at 212°F for 15 minutes 8¾ pounds of soybeans, roasting for 1 hour in a rotating oven at 250°F 8 ¾ pounds of soybeans and roasting for 1 hour in a rotating oven at 250°F 12 ½ pounds of wheat. The boiled soybeans, roasted soybeans and wheat were mixed until a uniform mixture was obtained. The mixture was ground with Urschel mill until all particles has a size of less than 10 microns. To the resulting ground mixture was then added 0.1 gram of dry powered Koji culture and allowed to ferment 5 days at 82°F.

EXAMPLE 2

The Koji of Example 1 was placed in 167 pounds of sterilized 18 w/v% aqueous NaCl contained in a stainless steel mixing vessel fitted with a paddle stirrer and mixed until a slurry was produced. With mixing, 13 cc. of inoculant in 18 w/v% saline solution was added to the slurry. The inoculant contained approximately 1 × $10^{10}$ organisms of *Sacchromyces rouxii*. The mixing vessel was capped with a head plate having a nitrogen inlet and a nitrogen outlet. Nitrogen was flushed through the head space of approximately 2 cu. ft. at a rate of approximately 10 cc/min. The slurry was maintained at between 80° and 84°F by means of a water jacket surrounding the mixing vessel. The above conditions were maintained for a total of 5 days, with a 15 minute stirring every 4 hours. After the 5 day period, the nitrogen flush was stopped every 4 hours and replaced by an air flush for 15 minutes, with stirring during the flush and with stirring for 15 minutes after the air flush was completed. Nitrogen was then again flushed through the head space and continuously maintained until the next air flush. The above temperature conditions, nitrogen and air flusning scdedule was continued for a total of 9 days beyond the initial 5 day fermentation period (e.g., a total of 14 days processing time).

The vessel was then opened and the fermenting Maromi was inoculated with 1 × $10^{10}$ organisms of *Torulopsis versatilis*. The vessel was then again closed and the condiltions described above were continued for an additlional 12 days, i.e., a total processing time of 26 days.

Thereafter, the liquid was separated form the solids by means of a conventional filter press. The liquid had the color and aroma of soy sauce. The taste was that of a good soy sauce with medium body. The soy sauce was aged for 2 weeks in a stainless steel closed vat and the flavor developed into a very full-bodied, good tasting soy sauce.

The flavor of the soy sauce produced was compared with the soy sauce produced according to Example 2 of the aforementioned copending application. The flavor produced according to the present process was determined to be significantly better than the flavor produced by Example 2 of the said application.

EXAMPLE 3

The procedure of Example 2 was repeated except that the inoculant contained approximately equal amounts of *Sacchromyces rouxii* and *Debaryomyces hansenii*. The resulting flavor was significantly superior to that of Example 2.

EXAMPLE 4

This example illustrates the use of organisms isolated from natural Maromi.

Five grams of YM powder* were added to 100 cc. of 18 w/v% saline solution and sterilized at 250°F for 15 seconds and designated "media 1."

*YM powder is YM agar (dehydrated) as disclosed in Wickerham, Tech. Bull No 1029, U.S.D.A. 1951 and contains yeast extract, beef extract, dextrose and agar. This is a standard commercially available material.

Five grams of YM powder were added to 100 cc of water, sterilized at 250°F for 15 seconds and designated "media 2."

Media 1 and media 2 were cooled to 115°F and 20 cc. of each media was placed in separate 3 inch diameter sterilized petri dishes (designated dish 1 and dish 2). Media 1 and 2 were streaked with 1 year old naturally produced Maromi and allowed to incubate at 71°F for 4 days.

With bacteriological needles, the yeast cultures (visually identiflied) which either flaky, dull or shiny were removed from dishes 1 and 2 and streaked in separate petri dishes containing the same, respective, media as described above. These dishes were incubated at 71°F for 4 days. This purifying procedure was repeated 3 times, after which pure cultures of flaky, dull and shiny yeast cultures were obtained. The cultures were identilfied as Sacchromyces and Debaryomyces.

Equal portions of the flaky, dull and shiny cultures were used in the procedure of Example 2, in the same total amounts as in Example 2, instead of the *Sacchroymces rouxii*. The produced soy sauce had an excellent flavor and full body.

What is claimed is:

1. In a Koji and Maromi process for the production of soy sauce which consists essentially of inoculating Koji or Maromi with at least 10 organisms per cc. of liquid of a yeast selected from the group consisting of Saccaromyces, Debaryomyces, Maromi-isolated organisms and mixtures thereof, fermenting the inoculated Koji or Maromi for at least 3 days at a temperature of between about 60° and 110°F. under anaerobic-to-microaerophillic conditions and separating the liquid of the fermented Maromi from the solids, the improvement consisting essentially of inoculating the fermenting Koji or Maromi with at least 10 organisms per gram of fermenting Koji or Maromi with at least one member of the genus Torulopsis and continuing the fermentation thereof at temperatures of 60° to 110°F.

2. The process of claim 1 wherein the Torulopsis organism is inoculated in the fermenting Maromi after the Maromi has fermented for at least 5 days.

3. The process of claim 1 wherein the said Maromi is produced form a Koji which was ground to a particle size which will pass through a No. 3 U.S. sieve screen.

4. The process of claim 3 wherein the said Koji was ground at a temperature below 145°F and has an average particle size of less than 1,000 microns.

5. The process of claim 4 wherein the said temperature is below 130°F.

6. The process of claim 1 wherein the said Maromi contains an edible salt solution and the amount of salt in said solution is from 5–30 w/v%.

7. The process of claim 6 wherein the said salt is NaCl.

8. The process of claim 6 wherein the said solution contains from 15–20 w/v% of NaCl.

9. The process of claim 8 wherein the said solution contains approximately 18 w/v% of NaCl.

10. The process of claim 1 wherein Maromi is produced from Koji containing a grain or cereal.

11. The process of claim 10 wherein the grain or cereal is wheat.

12. The process of claim 11 wherein the said Koji contains from 25–75% by weight of soybeans and from 75–25% by weight of wheat.

13. The process of claim 12 wherein approximately one-half of the soybeans have been boiled, one-half of the soybeans have been roasted and the wheat has been roasted.

14. The process of claim 1 wherein the Maromi is produced from a Koji which contains up to 40% solids.

15. The process of claim 1 wherein the Maromi contains at least 1,000 yeast organisms per cc. of liquid.

16. The process of claim 1 wherein the yeast are selected from *Saccharomyces rouxii* and *Debaryomyces hansenii*.

17. The process of claim 1 wherein the said yeast are Maromi isolated organisms.

18. The process of claim 1 wherein the inoculated Maromi is initially fermented for 3 to 14 days at a temperature between 60° and 110°F under a substantially inert oxygen-free atmosphere and subsequently further fermented for at least 5 days at a temperature between 60° and 110°F under a substantially inert oxygen-free atmosphere.

19. The process of claim 18 wherein at least intermittent aeration is carried out during said initial fermentation.

20. The process of claim 19 wherein the Maromi is agitated during said at least intermittent aeration.

21. The process of claim 19 wherein microaerophillic conditions are established for at least part of the said initial fermentation.

22. The process of claim 18 wherein at least intermittent aeration is carried out during the said subsequent fermentation.

23. The process of claim 22 wherein the said aeration of the said subsequent fermentation is carried out with agitation.

24. The process of claim 22 wherein microaerophillic conditions are established for at least part of said subsequent fermentation.

25. The process of claim 22 wherein the aeration is intermittent, and the time period of aeration is less than 2 hours and the aeration is carried out at least once a day.

26. The process of claim 1 wherein the Koji is made from soybeans and wheat.

27. The process of claim 18 wherein the total fermentation time is 30 days or less.

28. The product produced by the process of claim 1.

* * * * *